May 26, 1959     W. R. COURTRIGHT     2,887,815
BAIT CARRYING ARTIFICIAL LURES
Filed May 21, 1958

INVENTOR.
WILLIAM R. COURTRIGHT
BY
ATTORNEY

United States Patent Office 2,887,815
Patented May 26, 1959

2,887,815
BAIT CARRYING ARTIFICIAL LURES
William R. Courtright, Detroit, Mich., assignor of one-half to Peter MacFadyen, Highland Park, Mich.
Application May 21, 1958, Serial No. 736,739
4 Claims. (Cl. 43—42)

This invention relates to artificial lures and in particular to a plug type artificial lure generally in the form of a fish and including convenient means for carrying live or other bait, which lure may be used either as an unbaited lure or a bait carrying lure according to the wishes of the fisherman.

The primary object of the invention is to provide an all-purpose artificial lure which may be employed as a casting plug or a trolling plug, and which incorporates simple and effective means for carrying live bait or other bait that may be selected by the fisherman.

Another object of the invention is to provide an artificial lure including readily manipulated and easily used means for carrying live or other bait.

Another object of the invention is to provide an artificial lure adapted to carry live or other bait protected by fish hooks whereby to prevent fish from "stealing" the bait without being hooked.

A further object of the invention is to provide a plug type artificial lure including a body portion through which an easily manipulable coiled spring bait carrier is operatively mounted, the said bait carrier being readily accessible for use at all times and so arranged as to permit the artificial lure to be used as either a baited or unbaited casting plug.

Other objects of the invention will become apparent by reference to the following detailed description taken in connection with the accompanying drawing, in which.

Figure 1:
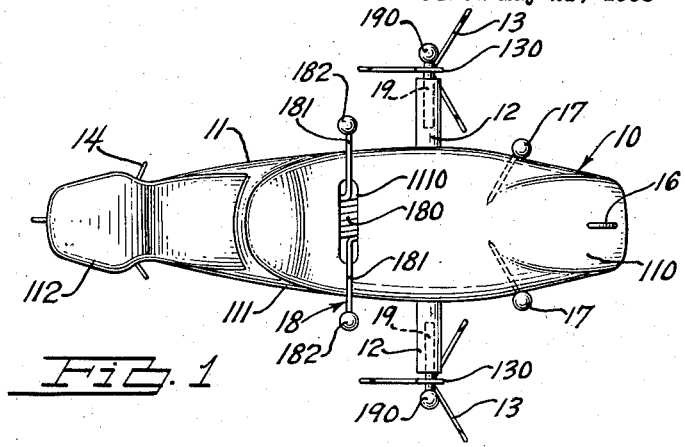
Fig. 1 is a top plan view of an artificial lure embodying the invention.

Referring now to the drawing wherein like reference numerals refer to like and corresponding parts throughout the several views, the particular artificial lure 10 disclosed for the purpose of illustrating the invention consists of a body or plug 11 preferably made of wood, plastic or other buoyant material formed to resemble a fish or the like, but of substantial width as indicated in the drawings. The body 11 includes a head 110, a midsection 111 and a tail element 112, all of which may be formed in any desired manner, but preferably as indicated in the drawings. The body 11 has an outrigger element 12 extending laterally therethrough at the forward portion of the mid-section 111 thereof, which outrigger element 12 carries a three prong fish hook 13 at each of its outer ends. The rear end or tail 112 of the body 11 is provided with a three prong fish hook 14 connected thereto in depending relationship therefrom by such means as a hook anchorage eye 15. A fish line anchorage eye 16 is secured to the forward portion of the head 110 of the body 11 and preferably extends upwardly from the top thereof. Ball headed pins 17 may be inserted in each side of the head 110 to serve to provide "eyes" to make the artificial lure appear more life-like.

Figure 5:
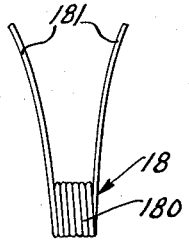
Fig. 5 is a front elevational view of the bait carrying element as formed prior to assembly through the body of the artificial lure.
Figure 2:
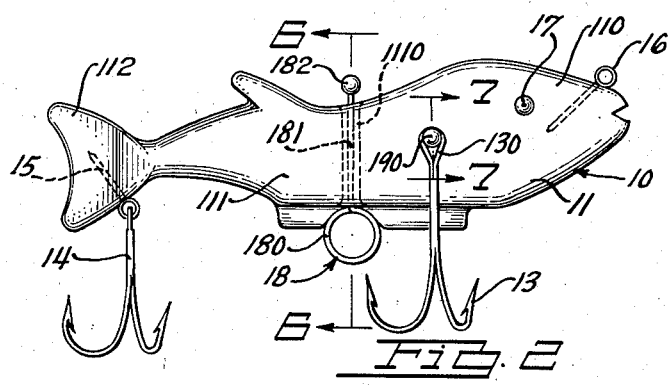
Fig. 2 is a side elevational view.
Figure 6:
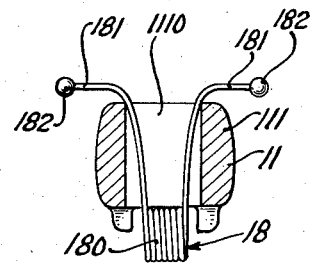
Fig. 6 is a transverse sectional view taken on the line 6—6 of Fig. 2 showing the bait carrying element assembled through the body of the artificial lure with its operating arms bent laterally outwardly.
Figure 3:
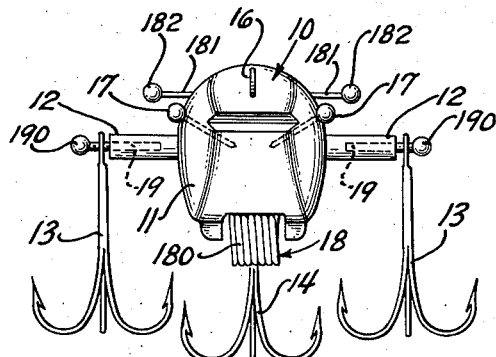
Figs. 3 and 4 are front and rear elevational views respectively.
Figure 4:
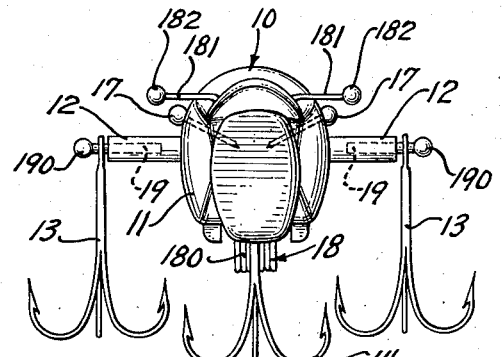
Figure 7:
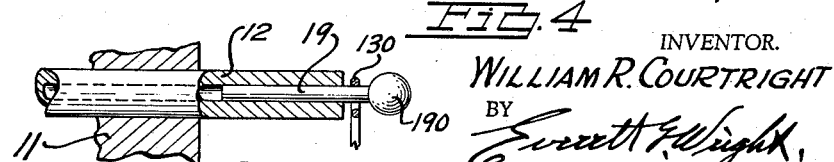
Fig. 7 is an enlarged fragmentary sectional view taken on the line 7—7 of Fig. 2 showing in detail a preferred form of outrigger fish hook supporting means that may be employed.

The midsection 111 of the said body 11 of the lure 10 has a vertical transversely disposed slot 1110 therethrough to accommodate freely the operating arms 181 of a coiled spring bait carrying element 18 consisting of a transversely disposed coiled spring 180 having a pair of operating arms 181 extending upwardly from the outermost coils thereof. The said bait carrying element 18 is first formed with its operating arms 181 straight as shown in Fig. 5, and, after the said operating arms 181 are telescoped through the said vertical transversely disposed slot 1110 in the midsection 111 of the lure body 11, the said operating arms 181 are each preferably bent at a point slightly above the lure body 11 into a lateral outward horizontal position adjacent to the top of the said lure body 11 as best shown in Fig. 6. The ends of the operating arms 181 are provided with knobs 182 or may be otherwise deformed to provide finger pressure grips. The squeezing together of the operating arms 181 of the bait carrying element 18 causes the bottom of the coil of the coiled spring 180 to open up laterally with respect to each other and receive live or other bait.

If live bait is used, the dorsal fin of a live minnow or other small live fish is inserted between open coils at the bottom of the coiled spring 180 of the bait carrying element 18 when held open by the squeezing of the operating arms 181 thereof toward each other. Releasing the operating arms 181 then permits the bottoms of the coils of the coiled spring 180 of the bait carrying element 18 to grip the bait and hold its firmly. In the example given, the said coils of the coiled spring 180 of the bait carrying element 18 would grip the dorsal fin of the live minnow or other live bait. Obviously, other live or dead bait of inanimate bait may be used, and when bait is carried by the bait carrying element 18, it is free to wobble below the bait carrier 18 and is protected from being stolen by game fish by the fish hooks 13 and 14 which flank the said bait.

Of importance to protecting bait carried by the bait carrying element 18 from being stolen or lost during fishing is the location of the fish hooks 13 and 14. The two side hooks 13 are preferably supported on the outrigger element 12 which may be of rigid construction as shown in the drawings or it may be formed of a relatively stiff yet flexible wire if desired. The outrigger element 12 as shown in the illustrative embodiment of the invention consists of a tube fixed laterally through and extending from both sides of the body 11 of the fish lure 10 at the forward portion of the midsection 111 thereof somewhat forward of the bait carrying element 18. This tube is of sufficient length to hold the hooks 13 at the outer end thereof in the desired spaced relationship from the bait carried by the bait carrying element 18 so that the hooks 13 will flank the bait to prevent it from being stolen by game fish and yet not engage or become hooked onto the said bait. Inasmuch as the hooks 13 carried by the outrigger element 12 are located somewhat forward of the bait carrying element 13, they more or less flank the front of bait carried by the bait carrying element 18 and likewise prevent loss of bait carried thereby when a fish strikes the lure. Each of the hooks 13 preferably has an enlarged eye 130 through which is freely telescoped a hook supporting pin 19 preferably having a round head 190. The hook supporting pins 19 are pressed into the outer ends of the outrigger tube with the heads 190 thereof spaced slightly from the ends of the said outrigger tube to hold the hooks 13 thereon. Inasmuch as the eye 130 of each hook 13 is somewhat larger than the shank of its hook supporting pin 19 and smaller than the head 190 thereof, and since the head 190 of each hook supporting pin 19 is spaced from an end of the outrigger tube, each hook 13 will have the desired swinging action. Obviously, a suitable relatively stiff yet resilient spring wire may be substituted for the outrigger tube, and the hooks 13 may be hung from the ends thereof in any conventional manner. It is preferable to hold the hooks 13 outwardly a sufficient distance from the bait carried by the bait carrying element 18 so that the hooks 13 will not engage the bait. The tail hook 14 flanks the rear of bait carried by the said bait carrying element 18, and is preferably located a sufficient distance from bait carried by the bait carrying element so that it will not hook the same.

Although but a single embodiment of the invention has been shown and described in detail, it is obvious that many changes may be made in the size, shape, proportion, arrangement and detail of the various elements of the invention, all within the spirit and scope of the invention as defined by the appended claims.

I claim:

1. An artificial lure comprising a body member having a vertically disposed transverse slot therethrough substantially at the longitudinal center thereof, a coiled spring bait carrying element including a pair of operating arms disposed adjacent the bottom of said body member with its operating arms extending upwardly through said slot, and fish hooks secured to and depending from said body member laterally and rearwardly spaced from said bait carrying element flanking said bait carrying element whereby to prevent a fish striking the lure from taking bait carried by said bait carrying element without being hooked, the manual squeezing together of the operating arms of said bait carrying element opening the bottom of the coils thereof to receive and release bait carried thereby.

2. An artificial lure comprising a body member having a vertically disposed transverse slot therethrough substantially at the longitudinal center thereof, a coiled spring bait carrying element including a pair of operating arms disposed adjacent the bottom of said body member with the said operating arms extending freely through said slot and bent laterally outwardly adjacent the top of said body member, and fish hooks mounted in depending relationship from said body member laterally and rearwardly spaced from said bait carrying element, the manual squeezing together of the operating arms of said bait carrying element opening the bottom of the coils thereof to receive and release bait carried thereby.

3. An artificial lure comprising a body member having a vertically disposed transverse slot through the longitudinally central portion thereof, a coiled spring bait carrying element including a pair of operating arms suspended at the bottom of said body member adjacent thereto by said operating arms extending through said slot and bent laterally outwardly adjacent the top of said body member, an outrigger extending laterally from both sides of said body member forward of the said bait carrying element including a fish hook mounted on each of the outer ends thereof, and a fish hook secured to the rear portion of said body member and depending therefrom, the manual squeezing together of the operating arms of said bait carrying element opening the bottom of the coils thereof to receive and release bait carried thereby.

4. An artificial lure comprising a body member having a vertically disposed transverse slot through the longitudinally central portion thereof, a coiled spring bait carrying element including a pair of operating arms suspended at the bottom of said body member adjacent thereto by said operating arms extending through said slot and bent laterally outwardly adjacent the top of said body member, an outrigger extending laterally from both sides of said body forward of the said bait carrying element including a fish hook mounted on each of the outer ends thereof, and a fish hook secured to and depending from the rear portion of said body member rearwardly spaced from said bait carrying element, the manual squeezing together of the operating arms of said bait carrying element opening the bottom of the coils thereof to receive and release bait carried thereby.

No references cited.